3,138,519
METHOD OF PESTICIDAL CONTROL

Joseph R. Riden, Jr., Pittsburgh, and James P. Flavin, McKees Rocks, Pa., assignors to Chemagro Corporation, New York, N.Y., a corporation of New York
No Drawing. Filed May 24, 1957, Ser. No. 661,287
7 Claims. (Cl. 167—22)

The present invention relates to new halogenated ethenyl sulfones and to their use primarily as fungicides, but also as pesticides to control other pests, e.g., as bactericides, nematocides and even as insecticides and weedicides.

It is an object of the present invention to prepare novel halogenated ethenyl sulfones.

Another object is to provide compositions containing halogenated ethenyl sulfones which have outstanding utility in protecting a wide variety of materials from fungi.

An additional object is to provide compounds which afford protection against a wide range of pests.

A further object is to provide compositions containing halogenated ethenyl sulfones which have outstanding utility in protecting a wide variety of materials from bacteria.

Still another object is to provide halogenated ethenyl sulfone compositions which protect plants against nematodes.

Yet another object is to provide novel weedicides containing halogenated ethenyl sulfone.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the preparation of halogenated ethenyl sulfones of the formula

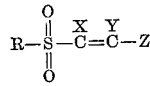

and compositions containing such sulfones. In the formula R is an alkyl group; at least two of X, Y and Z are a halogen of atomic weight not over 80, i.e., fluorine, chlorine or bromine, and the third member of X, Y and Z is either a halogen of atomic weight not over 80 or hydrogen. Preferably, X and Y are chlorine and Z is hydrogen. The dihaloalkenyl sulfone compounds are much superior to the trihaloalkenyl sulfone compounds. The most preferred compounds are 1,2-dichloroethenyl methyl sulfone, 1,2-dichloroethenyl n-propyl sulfone and 1,2-dichloroethenyl n-butyl sulfone. In general, the 1,2-dichloroethenyl n-alkyl sulfones are preferred over the corresponding compounds wherein the n-alkyl group is replaced by a secondary or tertiary alkyl group. Similarly, the alkyl group preferably is a lower alkyl group, generally of 1 to 8 carbon atoms and, as previously indicated, most desirably has not over 4 carbon atoms. For some reason which cannot be fully explained, 1,2-dichloroethenyl ethyl sulfone is not as outstanding a compound as its methyl, n-propyl and n-butyl homologues. Many of the compounds, including in particular the preferred compounds, are novel compounds per se.

Typical examples of compounds which can be used according to the present invention are 1,2-dichloroethenyl methyl sulfone; 1,2-dichloroethenyl ethyl sulfone; 1,2-dichloroethenyl n-propyl sulfone; 1,2-dichloroethenyl isopropyl sulfone; 1,2-dichloroethenyl n-butyl sulfone, 1,2-dichloroethenyl secondary butyl sulfone; 1,2-dichloroethenyl tertiary butyl sulfone; 1,2-difluoroethenyl methyl sulfone; 1,2-difluoroethenyl ethyl sulfone; 1,2-difluoroethenyl n-propyl sulfone; 1,2-difluoroethenyl n-butyl sulfone; 1,2-dibromoethenyl methyl sulfone; 1,2-dibromoethenyl ethyl sulfone; 1,2-dibromoethenyl n-propyl sulfone; 1,2-dibromoethenyl n-butyl sulfone; 1-chloro-2-bromoethenyl methyl sulfone; 1-bromo-2-chloroethenyl methyl sulfone; 1,2-dichloroethenyl isobutyl sulfone; 1,2-dichloroethenyl n-amyl sulfone; 1,2-dichloroethenyl n-hexyl sulfone; 1,2-dichloroethenyl n-heptyl sulfone; 1,2-dichloroethenyl n-octyl sulfone; 1,2-dichloroethenyl 2-ethylhexyl sulfone; 1,2-dichloroethenyl n-decyl sulfone; 1,2-dichloroethenyl n-octadecyl sulfone; 1,2-dichloroethenyl n-dodecyl sulfone; 1,2-dibromoethenyl n-octadecyl sulfone; 1,2-difluoroethenyl n-octadecyl sulfone; trichloroethenyl methyl sulfone; trichloroethenyl ethyl sulfone; trichloroethenyl n-propyl sulfone; trichloroethenyl n-butyl sulfone; trichloroethenyl isobutyl sulfone; trichloroethenyl secondary butyl sulfone; trichloroethenyl tertiary butyl sulfone; trichloroethenyl n-amyl sulfone; trichloroethenyl n-hexyl sulfone; trichloroethenyl n-octyl sulfone; trichloroethenyl n-octadecyl sulfone; tribromoethenyl methyl sulfone; tribromoethenyl ethyl sulfone; tribromoethenyl n-propyl sulfone; tribromoethenyl n-butyl sulfone; trifluoroethenyl methyl sulfone; trifluoroethenyl ethyl sulfone; trifluoroethenyl n-propyl sulfone; trifluoroethenyl n-butyl sulfone; 1,2-dichloro, 2-bromoethenyl methyl sulfone; 1-chloro-2,2-dibromoethenyl n-butyl sulfone; 1-chloro-2-fluoro-2-bromoethenyl n-propyl sulfone; 2,2-dichloroethenyl methyl sulfone; 2,2-dichloroethenyl n-butyl sulfone; 2,2-dichloroethenyl n-octyl sulfone; 2,2-dibromoethenyl n-butyl sulfone; 2,2-difluoroethenyl methyl sulfone.

As previously stated, the preferred compounds are the 1,2-dichloroethenyl alkyl sulfones, particularly the n-alkyl compounds and especially those members of this class having less than 5 carbon atoms and more especially those compounds where the alkyl group is methyl, n-propyl or n-butyl.

The compounds of the present invention are particularly useful as fungicides. Fungicides used as plant materials may be roughly divided into the following classifications:

(1) Soil fungicides
(2) Seed fungicides, and
(3) Foliar fungicides.

A soil fungicide embodies the principle of intimately mixing the fungicide with the soil prior to planting the crop. The fungicide may be applied to the soil as a soil drench with an emulsifiable concentrate in water or organic solvent, as a slurry of a wettable powder, as a wettable powder or as a granular formulation.

A seed fungicide is used to protect the seeds during their germination and emergent period. In this case, the fungicide is applied directly to the seed prior to planting as a dust, wettable powder, slurry, or liquid formulation. All of these formulations may be applied with a sticking agent to properly coat the seed. It should be noted relative to the above that a seed protectant protects the seed from organisms to be found in its environment whereas a seed disinfectant controls fungi already present within or upon the seed.

The third general classification of fungicides are those which protect the growing plant from attack by fungi. These fungicides may be applied prior to or after this attack. A plant protectant guards against possible future attack by fungi whereas an eradicant or chemotherapeutant fungicide controls the fungi already invading the plant. This general classification of fungicides may also be termed "foliage fungicides" as they are applied to the foliage of the plane. A foliage fungicide may be applied as a spray made up from emulsifiable concentrates or wettable powder formulations, or as a dust.

On May 21, 1957, there issued to Metivier Patent No. 2,793,234 which discloses and claims certain 1,2-dihaloethenyl aromatic sulfones and mentions the use of these materials as fungicides. In affidavits in support of the Metivier patent, it is shown that many of the compounds of the patent are effective against certain fungi and against these fungi are comparable to Captan, in some instances being slightly better and in other instances slightly worse.

The tests in the affidavits in the Metivier patent show that 1,2-dichloroethenyl phenyl sulfone is superior to 1,2-dichloroethenyl benzyl sulfone.

The tests also show that the sulfoxides have activity which is comparable to that of the sulfones. The results of Metivier with the benzyl compounds would lead one to expect that substituting an aliphatic grouping for the aromatic grouping attached to the sulfonyl group would result in reduction of the fungicidal activity. It has now been found, surprisingly, that exactly the contrary is the case. 1,2-dihaloethenyl alkyl sulfones have been found to be superior to their aromatic analogues in fungicidal activity and also have been found to have a much wider range of activity than the aromatic compounds.

Furthermore, it has been discovered that the smaller the alkyl chain, the more active is the compound. The n-alkyl compounds, and in particular the n-alkyl derivatives of 1,2-dichloroethenyl sulfone, have the most outstanding results and of these compounds the most active is the methyl. For some reason which is not understood, the ethyl compound is not as effective as the n-propyl or n-butyl compound but, with this exception, the general rule holds true that the smaller the alkyl group the more effective the compound. It has also been noted that whereas the sulfoxide compounds are substantially as effective as the sulfones in Metivier, the sulfoxides of the 1,2-dihaloethenyl alkyl sulfones of the instant invention have a greatly reduced activity.

The compounds of the present invention, particularly the preferred compounds, have the advantage over Metivier's compounds of being less costly to prepare.

The preferred compounds are also, in general, more water soluble than the compounds of Metivier. Additionally, the compounds of the present invention are liquids and, hence, easier to emulsify and apply as a liquid spray.

It is essential that the sulfone grouping be present, and it is not sufficient merely to have a sulfur bonded to oxygen as in a sulfoxide group.

It has been noted, for example, that where 1,2-dichloroethenyl phenyl sulfone is ineffective as a seed protectant, the 1,2-dichloroethenyl alkyl sulfones are very good seed protectants. Similarly, where the phenyl compound is virtually ineffective as a soil fungicide, the alkyl sulfones have outstanding soil fungicide activity.

They are also effective as pesticides for controlling bacteria, smuts, mildew and nematodes, and even weeds. In fact, they show surprisingly good activity against a wide variety of plant pests. Their weedicidal activity is particularly surprising since chlorinated polyvinyl sulfone is ineffective as a herbicide.

When they are applied against foilage disease-causing organisms, they are normally applied at low dosages, e.g., ¼ to 2 pounds per acre. As soil fungicides, they are applied in the range of 25 pounds per acre.

As weedicides they are normally applied at high dosage levels, and they are particularly effective against broad leafed plants, e.g., dandelions, plantain, etc.

The compounds of the present invention are also useful for protecting cloth, leather, wood and painted surfaces from attack by fungi and other organisms. While it is possible to apply the compounds of the present invention in undiluted form to the plant or other material to be protected, it is frequently desirable to apply the novel sulfones in admixture with either solid or liquid inert, pesticidal adjuvants. Thus, the sulfones can be applied to the plants for fungicidal purposes, for example, by spraying them with aqueous or organic solvent dispersions of the sulfone. Similarly, wood surfaces can be protected by applying a protective film of the sulfone by brushing, spraying or dipping utilizing a liquid dispersion of the sulfone. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketone such as acetone, methyl ethyl ketone and cyclohexanone, chlorinated hydrocarbons, such as carbon tetrachloride, chloroform, trichloroethylene, perchloroethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ether, alcohols such as ethanol, isopropanol and amyl alcohol, etc.

The sulfones can also be applied to plants and other materials along with inert solid fungicidal adjuvants or carriers such as talc, pyrophyllite, Attaclay, kieselguhr, chalk, diatomaceous earth, lime, calcium carbonate, bentonite, fullers' earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having to 14 to 18 carbon atoms, alkylphenolethylene oxides, e.g., p-isooctyl phenol condensed with 10 ethylene oxide units; and soaps, e.g., sodium stearate and sodium oleate. Typical surface active agents are: Aerosol OS (sodium salt of propylated naphthalenesulfonic acid); Aerosol OT [(di-2-ethylhexyl) ester of sodium sulfosuccinic acid]; Alkanol B (sodium alkylnaphthalene sulfonate); Alrosene 31 (sodium salt of modified alcohol sulfate from cocoanut fatty acids); Arctic Syntex M (sodium salt sulfonated monoglyceride of cocoanut fatty acids); Areskap 100 [o-HOC$_6$H$_4$C$_6$H$_3$(C$_4$H$_9$)(SO$_3$Na)]7; Areskap 300 [(C$_4$H$_9$)(SO$_3$Na)C$_6$H$_3$C$_6$H$_5$]; Arlacel C (sorbitan sesquioleate); Arquad 12 (mainly lauryltrimethyl ammonium chloride); Arquad 18 (mainly octadecyltrimethyl ammonium chloride); Brij 35 (polyethylene glycol lauryl ether); Daxad No. 11 (sodium salt of polymerized alkylated arene sulfonic acid); Duponol LS (sodium oleyl sulfate); Duponol WA (sodium lauryl sulfate); Emulsept

[CH$_3$(CH$_2$)$_n$COOCH$_2$CH$_2$NHCOCH$_2$NC$_5$H$_5$+Cl$^-$]

Ethofats (polyethylene esters of fatty acids or rosin acids, e.g., Ethofat 3, 7, 11, 13, 15, 19, etc.); Ethomeens

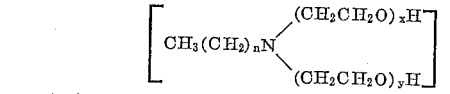

e.g., Ethomeen 8, 10, 12, 14, etc.; Ethomids

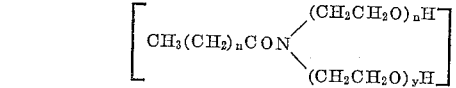

e.g., Ethomid 8, 10, 12, 14, etc.; Igepal CA (alkylphenyl polyethylene glycol ether); Igepon T (sodium N-methyl-N-oleyltaurate); Igepon A (sodium oleyl isethionate);

Intramine [(RCONHCH$_2$CH$_2$OSO$_3$Na) where RCOOH is commercial lauric acid containing myristic acid]; Invadine C (sodium alkylnaphthalene sulfonate); Leonil SA (sodium dibutyl naphthalene sulfonate); Marasperse C (sodium lignin sulfonate); Maypon 4C (proteinoleyl chloride condensation product); Miranols

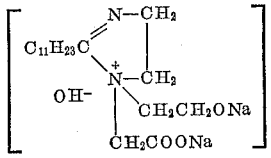

Myrj (polyethylene glycol stearate); Nacconol NR (sodium dodecyl benzene sulfonate); Wekal A (sodium salt of isopropylated naphthalenesulfonic acid); Nekal BX (sodium salt of butylated naphthalenesulfonic acid); Ninol 1281 (fatty acid ethanolamide); Nonic 218 (tertiary dodecyl polyethylene glycol thioether); Pluronics (condensation product of ethylene oxide and polypropylene glycol); Renex 25 (solidified urea complex of polyethylene glycol ester of mixed fatty and resin acids); Santomerse No. 1 (sodium dodecyl benzenesulfonate); Santomerse D (sodium decyl benzenesulfonate); Santomerse B [m - C$_6$H$_4$(COOC$_{12}$H$_{25}$)(SO$_3$Na)]; Sapamine KW [CH$_3$(CH$_2$)$_7$CH=CH(CH$_2$)$_7$CONHCH$_2$CH$_2$N(CH$_3$)(C$_2$H$_5$)$_2$]$^+$[CH$_3$OSO$_3$]$^-$ Span 20 (sorbitan monolaurate); Span 40 (sorbitan monopalmitate); Span 60 (sorbitan monostearate); Span 80 (sorbitan monooleate); Sterox CD (polyethylene glycol ester of tall oil acids); Sulframin DR (sodium salt of sulfonated condensation product of ethanolamine with a fatty acid); Tergitol 08 [C$_4$H$_9$CH(C$_2$H$_5$)CH$_2$OSO$_3$Na]; Tergitol 4

[C$_4$H$_9$CH(C$_2$H$_5$)CH$_2$CH$_2$CH(CH$_2$CH(CH$_3$)$_2$)OSO$_3$Na]; Terigtol 7
[C$_4$H$_9$CH(C$_2$H$_5$)CH$_2$CH$_2$CH(CH$_2$CH$_3$CH(C$_2$H$_5$)$_2$)OSO$_3$Na]

Triton W–30 [p-C$_8$H$_{17}$C$_6$H$_4$(OCH$_2$CH$_2$)$_2$OSO$_3$Na where C$_8$H$_{17}$ is diisobutyl]; Triton X–100

[p-C$_8$H$_{17}$C$_6$H$_4$(OCH$_2$CH$_2$)$_n$OH]

where C$_8$H$_{17}$ is diisobutyl]; Tween 20 [tris (polyoxyethylene) sorbitan monolaurate]; Tween 40 [tris (polyoxyethylene) sorbitan monopalmitate]; Tween 60 [tris (polyoxyethylene) sorbitan monostearate]; Tween 80 [tris (polyoxyethylene) sorbitan monooleate]; Ultrawet SK (sodium alkylbenzene sulfonate); Ultravon K (sodium salt of sulfonated alkyl benzimidazole); Aerosol MA (sodium dihexyl sulfosuccinate); Nekal BV (sodium dibutyl naphthalenesulfonate); Dreft (an alkyl sulfate); and Turkey red oil.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel sulfones of the present invention can be employed in compositions containing other pesticides, more especially fungicides, insecticides and bactericides, e.g., phenothiazine, pyrethrum, rotenone, DDT, etc.

The novel polyhaloalkenyl sulfones of the present invention can be prepared by reacting a mercaptan having the formula RSH where R is an alkyl group with a substituted ethylene having the formula

where at least three substituents are halogen of atomic weight not over 80 and the remaining substitutent is such a halogen or hydrogen to form a polyhalogenated ethenyl type sulfide followed by oxidation of this sulfide to the corresponding sulfone. The oxidation of the sulfide is preferably carried out with hydrogen peroxide. However, other oxidizing agents can be used such as permanganates, e.g., potassium permanganate, chromic acid, nitric acid, hypochlorites, e.g., sodium hypochlorite, organic peroxides, e.g., benzoyl peroxide, etc. The oxidation frequently is carried out in an organic solvent.

The preliminary reaction of the mercaptan with the polyhalo substituted ethylene is carried out in the presence of an acid acceptor such as alkali hydroxides, carbonates, bicarbonates and organic bases. Typcial acid acceptors include sodium hydroxide, potassium hydroxide, barium hydroxide, sodium carbonate, potassium carbonate, sodium bicarbonate, tetraethyl ammonium hydroxide, etc. Preferably, an organic solvent is also present, e.g., ethyl alcohol, methyl alcohol, n-butanol, etc.

The general scheme of the reaction is illustrated below:

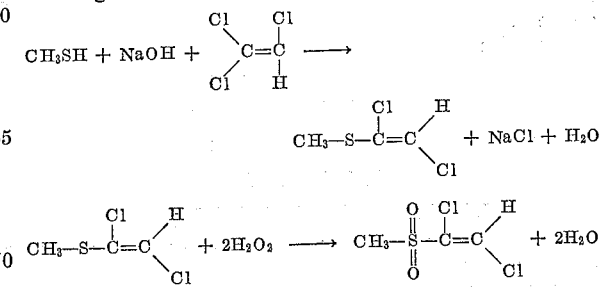

To insure that a monosulfone is produced, there is preferably employed an excess of the polyhaloethylene over one mol per mol of mercaptan in the sulfide forming reaction. In order to insure complete oxidation of the sulfide to the sulfone, an excess of the oxidizing agent is used.

In the specification and claims unless otherwise indicated, all parts and percentages are by weight.

EXAMPLE 1

1,2-Dichloroethenyl n-Butyl Sulfone

Potassium butyl mercaptide was prepared by adding 90 parts of n-butyl mercaptan to 200 parts of 95% ethyl alcohol in which 56 parts of potassium hydroxide had been dissolved. This reaction mixture was added during four hours to 380 parts of trichloroethylene with adequate stirring. External heat was applied to maintain reflux. After addition was complete, the reaction mixture was allowed to reach room temperature and the potassium chloride filtered off. The bulk of the excess trichloroethylene and the alcohol was removed by vacuum distillation and the residue placed in two volumes of water. The organic layer was separated and the aqueous layer washed twice with chloroform. The organic layers were combined, washed twice with water and the solvents were removed under vacuum. The residue was then distilled at 18 mm. pressure, the distillate boiling between 83 and 86° C. being 1,2-dichloroethenyl n-butyl sulfide.

To 37 parts of the 1,2-dichloroethenyl n-butyl sulfide in 13 parts of glacial acetic acid was added 29 parts of hydrogen peroxide while maintaining the temperature at 90 to 95° C. After this addition was complete (2 hours) the mixture was refluxed two hours longer. The product was isolated by adding two volumes of water to the reaction mixture and extracting with chloroform three times. The organic layers were combined and washed with water to remove excess acid. After removing the solvents under vacuum, 1,2-dichloroethenyl n-butyl sulfone remained as a light yellow oil. Density 1.323 20/20. Refractive index 1.5025 20/D.

Analysis: 14.29% S, 33.00% Cl. Theory: 14.7% S, 32.7% Cl.

Formula:

$$CH_3CH_2CH_2CH_2\underset{\underset{O}{\|}}{\overset{\overset{O}{\|}}{S}}-\underset{\underset{H}{|}}{\overset{\overset{Cl}{|}}{C}}=\overset{Cl}{C}$$

EXAMPLE 2

Trichloroethenyl n-Propyl Sulfone

Potassium n-propanethiolate was prepared from 38 parts of n-propyl mercaptan and 28 parts of potassium hydroxide in 100 parts of 95% ethyl alcohol. This reagent was added during 2 hours to 200 parts of tetrachloroethylene at reflux. The reaction mixture was cooled, potassium chloride filtered off, and the solvents removed in vacuo. The product remaining was washed with water and distilled. Trichloroethenyl n-propyl sulfide was collected between 110 to 115° C. at 18 mm. pressure.

20 parts of the trichloroethenyl n-propyl sulfide were dissolved in 50 parts of glacial acetic acid and oxidized by adding 25 parts of hydrogen peroxide at 90 to 95° C. Trichloroethenyl n-propyl sulfone was isolated from the reaction mixture using the techniques described in Example 1.

Formula:

$$CH_3CH_2CH_2-\underset{\underset{O}{\|}}{\overset{\overset{O}{\|}}{S}}-\underset{\underset{Cl}{|}}{\overset{\overset{Cl}{|}}{C}}=\overset{Cl}{C}$$

EXAMPLE 3

1,2-Dichloroethenyl Methyl Sulfone

Sodium methyl mercaptide was prepared by adding 48 parts of methyl mercaptan to 200 parts of 95% ethyl alcohol in which 40 parts of sodium hydroxide had been dissolved. The sodium methyl mercaptide was added over a 2 hour period to 400 parts of trichloroethylene at reflux temperature. When the addition was complete, the reaction mixture was allowed to cool to room temperature and an equal amount of water was added. The organic layer was separated and the aqueous layer was extracted three times with chloroform. The organic layer and chloroform washings were combined, washed once with water and solvents removed by distillation at atmospheric pressure. The product was distilled at 13 mm. at which pressure 1,2-dichloroethenyl methyl sulfide was collected at 52 to 55° C.

21.5 parts of 1,2-dichloroethenyl methyl sulfide was added to 10 parts of glacial acetic acid and oxidized by the addition of 10 parts of hydrogen peroxide, the temperature being maintained between 90 to 95° C. After completing this addition, the mixture was kept at the same temperature for an additional hour. The reaction mixture was then diluted with twice its volume of water and the product isolated by extracting 3 times with chloroform. The solvent was then removed under vacuum leaving the product as a water white liquid with the following physical properties:

Density: 1.5555 20/20. Refractive index: 1.5210 20.5/D.

Analysis: Cl, 40.89%; S, 18.02%. Theory: Cl, 40.55%; S, 18.25%.

Formula:

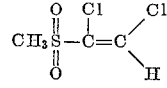

EXAMPLE 4

1,2-Dichloroethenyl n-Propyl Sulfone

Twenty-three parts of metallic sodium were added to 300 parts of absolute ethyl alcohol to form a solution of sodium ethylate. To this reagent was added 76 parts of n-propyl mercaptan to give an anhydrous solution of sodium n-propyl mercaptide. This mercaptide was then added during 2 hours to 400 parts of trichloroethylene at reflux temperature. The reaction mixture was then cooled, 2 volumes of water added and the organic layer separated. The aqueous layer was washed 3 times with chloroform and the organic layers combined. The organic solvents were removed by distillation. 1,2-dichlorothenyl n-propyl sulfide with a boiling point of from 77 to 81° C. at 10 mm. pressure was obtained by a vacuum distillation of the reaction mixture.

1,2-dichloroethenyl n-propyl sulfide was oxidized by dissolving 14 parts in 10 parts of glacial acetic acid and adding 12 parts of hydrogen peroxide using the conditions described in Example 1. 1.2-dichloroethenyl n-propyl sulfone was isolated by the procedure described in Example 1 and had the following physical properties:

Density: 1.3673 20/20. Refractive index: 1.5062 20/D.

Analysis: S, 15.80%; Cl, 34.77%. Theory: S, 15.76%; Cl, 34.98%.

Formula:

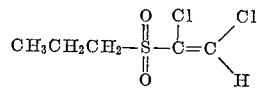

EXAMPLE 5

1,2-Difluoroethenyl Ethyl Sulfone

Using the procedure of Example 1 there were employed 62 parts of ethyl mercaptan, 200 parts of 95% ethyl alcohol, 56 parts of potassium hydroxide and 250 parts of trifluoroethylene.

To 24 parts of the 1,2-difluoroethenyl ethyl sulfide in 13 parts of glacial acetic acid were added 29 parts of hydrogen peroxide and the procedure of Example 1 followed to obtain 1,2-difluoroethenyl ethyl sulfone

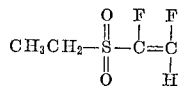

EXAMPLE 6

1,2-Dibromoethenyl n-Octyl Sulfone

Using the procedure of Example 1 there were employed 73 parts of n-octyl mercaptan, 200 parts of 95% ethyl alcohol, 20 parts of sodium hydroxide and 200 parts of tribromoethylene in step 1 to form 1,2-dibromoethenyl n-octyl sulfide. The oxidation step of Example 1 was then repeated replacing the 1,2-dichloroethenyl n-butyl sulfide by 60 parts of the 1,2-dibromoethenyl n-octyl sulfide to form 1,2-dibromoethenyl n-octyl sulfone of the formula

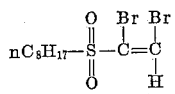

EXAMPLE 7

Tribromoethenyl n-Hexyl Sulfone

Using the procedure of Example 1 there were employed 116 parts of n-hexyl mercaptan, 300 parts of 95% ethyl alcohol, 40 parts sodium hydroxide and 600 parts tetrabromoethylene to form tribromoethenyl n-hexyl sulfide. The oxidation step of Example 1 was then repeated replacing the 1,2-dichloroethenyl n-butyl sulfide by 75 parts of the tribromoethenyl n-hexyl sulfide to form tribromoethenyl n-hexyl sulfone of the formula

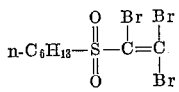

EXAMPLE 8

2,2-Dibromoethenyl Ethyl Sulfone 2-bromoethenyl ethyl sulfide was prepared by the method described by Arens et. al. in Rec. Trav. Chim. 75 481 (1956). This sulfide was then oxidized to 2-bromoethenyl ethyl sulfone by the process employed in present Example 1 using 35 parts of the sulfide in place of the 1,2-dichloroethenyl n-butyl sulfide. The 2-bromoethenyl ethyl sulfone was then brominated and dehydrobrominated as follows to give 2,2-dibromoethenyl ethyl sulfone

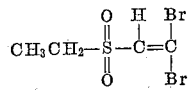

To one mol of 2-bromoethenyl ethyl sulfone in 100 ml. of $CCl_4$ was added one mol of bromine during 2 hours. The mixture was heated to 50° C. for 10 minutes and the whole mixture added to 1.25 mols of diethyl aniline at 80° C. The mixture was then refluxed for 2 hours, cooled to room temperature and water added. The $CCl_4$ layer was separated, washed with 2N hydrochloric acid, dried with sodium sulfate and then distilled to recover the 2,2-dibromoethenyl ethyl sulfone.

As previously indicated, the sulfones of the present invention have a very high degree of control over a broad range of organisms. In most cases they were even more effective in controlling the organisms than the materials now available for such purposes despite the fact that the materials now available are generally specific and do not protect effectively against the wide range of organisms against which protection is obtained with the novel polyhalogenated ethenyl sulfones of the present invention. The present compounds are effective against a wide range of organisms, displaying protection against fungi, aphids, bacteria and nematodes. They may be used as seed protectants, seed disinfectants, soil fungicides, foliar sprays and/or nematocides and bactericides.

The compounds of the present invention are stable and non-metallic. In addition, the preferred compounds are liquids and have desirable volatility and solubility characteristics which make them very desirable for use as pest control agents.

Typical examples of suitable formulations are given below.

EXAMPLE 9

A wettable powder fungicide was made from 20%, 1,2-dichloroethenyl methyl sulfone, 38% diatomaceous earth, 40% kaolin clay and 2% sodium N-methyl-N-oleoyl taurate (wetting agent). The mixture was ground so that over 99% passed through a 325 mesh U.S. Standard Sieve.

In place of the 1,2-dichloroethenyl methyl sulfone formulation of this example there were also made up two other formulations which were identical except that in one case the 1,2-dichloroethenyl methyl sulfone was replaced by an equal amount of 1,2-dichloroethenyl n-propyl sulfone, while in the other case 1,2-dichloroethenyl n-butyl sulfone was used as the replacement.

EXAMPLE 10

A granular fungicide comprising 5% of 1,2-dichloroethenyl n-propyl sulfone as the active component and 95% of calcined diatomaceous earth of 20 to 70 mesh size (U.S. Standard Sieve) as a granular absorbent diluent was prepared by spraying the sulfone in liquid state on the granules with mixing.

In place of the 1,2-dichloroethenyl n-propyl sulfone formulation of this example there were also made up two other formulations which were identical except that in one case the 1,2-dichloroethenyl n-propyl sulfone was replaced by an equal amount of 1,2-dichloroethenyl methyl sulfone, while in the other case 1,2-dichloroethenyl n-butyl sulfone was used as the replacement.

EXAMPLE 11

An emulsifiable spray concentrate fungicide preparation comprising 48 grams of 1,2-dichloroethenyl n-butyl sulfone, 10 grams of polyoxyethylene sorbitan monolaurate (Tween 20), as an emulsifier and sufficient xylene to make the mixture up to 100 ml. was prepared by stirring the ingredients together. In place of the 1,2-dichloroethenyl n-butyl sulfone concentrate of this example there were also made up two other concentrates which were identical except that in one case the 1,2-dichloroethenyl n-butyl sulfone was replaced by an equal amount of 1,2-dichloroethenyl methyl sulfone, while in the other case 1,2-dichloroethenyl n-propyl sulfone was used as a replacement.

EXAMPLE 12

The three spray concentrates of Example 16 were each diluted with 480 liters of water to give an aqueous emulsion containing 100 p.p.m. of active ingredient in each case.

Satisfactory results have also been obtained, for example, by emulsifying the sulfones directly in water without the addition of an organic solvent. Thus, one part of 1,2-dichloroethenyl butyl sulfone can be emulsified in 100 parts of water directly with the aid of 0.1 part of polyoxyethylene sorbitol (Atlox 1045).

The effectiveness of the instant compounds as pesticides has been tested both in vivo and in vitro and has been compared with other pesticides. In Table I there are given the results obtained by making a dispersion of the fungicide in sterile liquid potato dextrose agar followed, after solidifying, by inoculation with the fungus organism. The concentrations given in Table I are the minimum concentrations in p.p.m. at which fungal growth of the indicated fungi was inhibited.

The organisms chosen in this test with identifying data were:

| Code Letter | Organism | Disease Caused |
| --- | --- | --- |
| A | Monilina fructicola | Peach and cherry rots. |
| B | Helminthosporium sativum | Barley spot blotch. |
| C | Rhizoctonia solani | Root rot. |
| D | Fusarium oxysporium f. lycopersici | Tomato wilt. |
| E | Pythium debaryanum | Damping off. |
| F | Sclerotium rolfsii | Southern root rot. |
| G | Pullularia pullulans | Celluolytic degradation. |

TABLE I

| Chemical | A | B | C | D | E | F | G |
|---|---|---|---|---|---|---|---|
| 1,2-dichloroethenyl methyl sulfone | 15 | 35 | 10 | 50 | 5 | 10 | 60 |
| 1,2-dichloroethenyl n-propyl sulfoe | 15 | 35 | 15 | 60 | 10 | 10 | 60 |
| 1,2-dichloroethenyl n-butyl sulfone | 20 | 35 | 10 | 60 | 10 | 10 | 60 |
| Arasan (50% tetramethylthiuram disulfide) | 25 | 35 | 50 | >100 | >25 | 20 | 50 |
| PCNB (pentachloronitrobenzene) | 40 | >100 | >100 | >100 | >25 | >25 | >100 |
| Captan (N-trichloromethylmercapto-4-cyclohexene-1,2-dicarboximide) | 60 | 50 | >100 | >100 | >25 | >25 | >100 |

It can be seen from Table I that the compounds of the present invention are more efficient than commercial fungicides such as Arasan, Captan and PCNB against a wide variety of fungi. The compounds of the present invention moreover do not present the hazards which are present when mercurial fungicides such as Ceresan, for example, are employed.

The biological activity of the compounds of the present invention against nematodes was determined by mixing the chemical with soil in which tomatoes were grown. This soil was infested with root knot nematodes. The nematodes were extracted from the soil using the Baermann Funnel Technique. The efficiency of the compounds of the present invention as nematocides is illustrated in Table II wherein the percentages represent the percentage kill of nematodes.

TABLE II

| Chemical | Concentration, p.p.m. | Time (hrs.) | | | |
|---|---|---|---|---|---|
| | | 2 | 4 | 24 | 48 |
| 1,2-dichloroethenyl methyl sulfone | 100 | 10 | 50 | 80 | 100 |
| Do | 200 | 40 | 90 | 100 | 100 |
| Vapam (sodium N-methyl dithiocarbamate) | 100 | 80 | 100 | 100 | 100 |

From Table II it can be seen that the polyhaloethenyl sulfones of the present invention are effective nematocides. While they are not quite as rapidly acting as Vapam, they have other advantages over this chemical. For example, they will not only control nematodes, but will also control other soil pests against which Vapam is ineffective.

The effectiveness of the compounds of the present invention as bactericides is illustrated by Table III. The data for Table III was obtained by placing known amounts of the chemicals in agar slants as described in connection with Table I and finding the minimum concentration at which no growth occurred after four days. The results in Table III give the concentration of chemical in p.p.m.

TABLE III

| Chemical | Organism | | |
|---|---|---|---|
| | Bacillus subtils | Micrococcus pyogenis var. aureus | Escherichia coli |
| 1,2-dichloroethenyl methyl sulfone | 75 | 100 | 100 |
| 1,2-dichloroethenyl n-propyl sulfone | 100 | 100 | 100 |
| 1,2-dichloroethenyl n-butyl sulfone | 75 | 60 | 100 |

The compounds of the present invention were also tested as soil fungicides and were compared in this respect with other soil fungicides as shown in Table IV. The chemical to be tested was mixed with soil naturally infected with Pythium spp. Pea seeds were planted and the efficiency of the chemical noted on percent emergence.

TABLE IV

| Chemical | Lbs. of chemical/acre | | | | |
|---|---|---|---|---|---|
| | 50 | 25 | 23 | 9 | 6 |
| | Emergence percent | | | | |
| 1,2-dichloroethenyl methyl sulfone | 100 | 100 | 100 | 100 | 80 |
| 1,2-dichloroethenyl n-propyl sulfone | 100 | 100 | 100 | 100 | 80 |
| Pentachloronitro-benzene | 0 | 0 | 0 | 0 | 0 |
| Captan | 30 | 10 | 0 | 0 | 0 |
| Trans-1,2-bis(n-propylsulfonyl) ethene | 100 | 30 | 0 | 0 | 0 |
| Check | 0 | 0 | 0 | 0 | 0 |

The results obtained in Table IV with the compounds of the present invention are most remarkable. The compounds of the present invention were completely effective at about ⅙ the dosage of trans-1,2-bis(n-propylsulfonyl)ethene. Until the development of the instant soil fungicides, trans-1,2-bis(n-propylsulfonyl)ethene was considered the best soil fungicide tested.

The compounds of the present invention were also tested for biological efficiency and compared with other chemicals as pea seed protectants. The seeds were coated with the chemicals and planted in Pythium spp. infected soil. The emergence of the seedlings was recorded. The results are shown in Table V.

TABLE V

| Chemical | Ounces of chemical/bushel | | | | | |
|---|---|---|---|---|---|---|
| | 2.0 | 1.0 | 0.75 | 0.50 | 0.25 | 0.13 | 0.06 |
| | Emergence, Percent | | | | | |
| 1,2-dichloroethynyl methyl sulfone | | | 100 | 100 | 100 | 100 | 20 |
| 1,2-dichloroethenyl n-propyl sulfone | 70 | 10 | 0 | 0 | 0 | 0 | 0 |
| Trans-1,2-bis(n-propylsulfonyl) ethene | 10 | 0 | 0 | 0 | 0 | 0 | 0 |
| Arasan | 0 | 0 | 0 | 0 | 0 | 0 | 0 |
| Check | 0 | 0 | 0 | 0 | 0 | 0 | 0 |

Table V further illustrates the outstanding results obtained with the compounds of the present invention as seed protectants compared with the best known seed protectants. The results obtained with 1,2-dichloroethenyl methyl sulfone are spectacular at even much less than ⅒ the minimum dosage for the best previously known seed protectants.

The compounds of the present invention are also outstanding as seed protectants for sweet corn. Thus, with sweet corn in greenhouse tests using Pythium spp. 1,2-dichloroethenyl methyl sulfone was 100% effective at dosages of 0.75 ounce/bushel, 0.5 ounce/bushel, and 0.25 ounce/bushel while trans-1,2-bis(n-propylsulfonyl) ethene was 100% effective only at the 0.75 ounce dosage, falling off to 80% effectiveness at the 0.5 ounce dosage and to 70% effectiveness at the 0.25 ounce dosage. Chloranil was completely ineffective at these dosages as a seed protectant for sweet corn.

The compounds of the present invention also are good seed disinfectants, being in a class with the mercurials in this respect. Table VI shows the results as a seed disinfectant using oat seeds naturally infested with *Helminthosporium victoriae*. The results are expressed as percent control of this fungus which causes Victoria Blight.

TABLE VI

| Chemical | Ounces/bushel | | | |
|---|---|---|---|---|
| | 0.25 | 0.12 | 0.06 | 0.02 |
| | Percent | Percent | Percent | Percent |
| 1,2-dichloroethenyl methyl sulfone | 80 | 60 | 70 | 40 |
| 1,2-dichloroethenyl n-propyl sulfone | 70 | 70 | 70 | 50 |
| Trichloroethenyl n-propyl sulfone | 80 | 70 | 60 | 10 |
| Trans-1,2-bis (n-propylsulfonyl) ethene | 0 | 0 | 0 | 0 |
| Ceresan M (ethyl mercuric p-toluene sulfonanilide) | 60 | 70 | 70 | 80 |

As a further illustration of the advantage of the instand compounds over known pesticides, there is given the effectiveness of the vapor action of these compounds in inhibiting fungal growth. When 1,2-dichloroethenyl methyl sulfone is placed in a glass dish inside a petri dish containing agar upon which fungus is growing, the vapors of the sulfone are sufficient to inhibit growth of the fungi. This fact has been demonstrated with all seven organisms used in Table I as well as with Helminthosporium spp. and Ustilago spp. The organisms were allowed to grow on the agar and their growth pattern established before the chemical was added. In the case of most of the fungi tested, hyphal growth ceased almost immediately. In the other cases, growth stopped within a few minutes.

As a weedicide the compounds of the invention are particularly effective against broad leafed weeds and grasses, e.g., dandelions, plantain, etc. In a typical application, 1,2-dichloroethenyl methyl sulfone was applied to a field at a rate of 25 pounds/acre to kill the broad leafed weeds.

As a pre-emergent herbicide, 1,2-dichloroethenyl-n-propyl sulfone was effective at 20 pounds per acre on grasses and broad leaf weeds. As a post-emergent herbicide, 10 pounds per acre of this sulfone gave complete kill of setaria.

1,2-dichloroethenyl methyl sulfone controlled powdery mildew on oats at ¼ pound per acre without any signs of phytotoxicity.

Many of the present commercial fungicides leave much to be desired in view of their high toxicity and their irritating effect upon the throat, particularly in seed treatment practices. The compounds of the present invention are substantially devoid of these undesirable effects. Furthermore, the compounds of the present invention provide a wide range of protection in contrast to the very narrow range of activity of present day commercial products.

We claim:
1. A process for protecting a material from attack by a member of the group consisting of microorganisms and nematodes comprising applying to said material an effective amount of a halogenated ethenyl sulfone of the formula

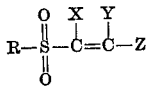

wherein R is an alkyl group, at least two of X, Y and Z are halgen of atomic weight not over 80 and the third member of X, Y and Z is selected from the group consisting of halogen of atomic weight not over 80 and hydrogen.

2. A process for protecting a material from attack by a member of the group consisting of microorganisms and nematodes comprising applying to said material an effective amount of a 1,2-dichloroethenyl alkyl sulfone.

3. A process for protecting a material from attack by fungi comprising applying to said material an effective amount of a 1,2-dichloroethenyl 1 to 8 carbon atom n-alkyl sulfone.

4. A process for protecting seeds from attack by fungi comprising applying to one of said seeds and the soil surrounding said seeds an effective amount of a 1,2-dichloroethenyl n-alkyl sulfone, said alkyl group having 1 to 8 carbon atoms.

5. A process according to claim 4 wherein the alkyl group has 1 to 4 carbon atoms.

6. A process for protecting seeds from attack by fungi comprising applying to said seeds an effective amount of a 1,2-dichloroethenyl n-alkyl sulfone, said alkyl group having 1 to 8 carbon atoms.

7. A process according to claim 6 wherein the alkyl group has 1 to 4 carbon atoms.

References Cited in the file of this patent
UNITED STATES PATENTS

| | | |
|---|---|---|
| 2,140,608 | Ufer | Dec. 20, 1938 |
| 2,288,282 | Hinsmann | June 30, 1942 |
| 2,484,489 | Craig | Oct. 11, 1949 |
| 2,570,917 | Calfee | Oct. 9, 1951 |
| 2,676,129 | Bashour | Apr. 20, 1954 |
| 2,695,308 | Gilbert | Nov. 23, 1954 |
| 2,731,380 | Shumard | Jan. 17, 1956 |
| 2,743,209 | Jones | Apr. 24, 1956 |
| 2,768,211 | Towne | Oct. 23, 1956 |
| 2,770,638 | Giolito | Nov. 13, 1956 |
| 2,793,234 | Metivier | May 21, 1957 |
| 2,795,525 | Stansbury | June 11, 1957 |

OTHER REFERENCES

Boehm: Liebig's Annalen 587, 51–62 (1954), cited in Chem. Abs. 49$^{c,d}$ 6824 (1955).